(12) United States Patent
Goodier

(10) Patent No.: US 8,578,707 B2
(45) Date of Patent: Nov. 12, 2013

(54) PROTECTION VALVE FOR HYDRAULIC DRIVE SYSTEM

(75) Inventor: Peter Charles Goodier, White, GA (US)

(73) Assignee: Paragon Tank Truck Equipment, LLC, Milwaukee, WI (US)

( * ) Notice: Subject to any disclaimer, the term of this patent is extended or adjusted under 35 U.S.C. 154(b) by 1168 days.

(21) Appl. No.: 12/496,192

(22) Filed: Jul. 1, 2009

(65) Prior Publication Data

US 2010/0257853 A1 Oct. 14, 2010

Related U.S. Application Data

(60) Provisional application No. 61/169,021, filed on Apr. 14, 2009.

(51) Int. Cl.
*F16K 31/00* (2006.01)

(52) U.S. Cl.
USPC .............................................. 60/329; 137/468

(58) Field of Classification Search
USPC .............................................. 60/329; 137/468
See application file for complete search history.

(56) References Cited

U.S. PATENT DOCUMENTS

| | | | | |
|---|---|---|---|---|
| 1,873,769 A | * | 8/1932 | Lang | 137/468 |
| 4,223,646 A | * | 9/1980 | Kinder | 60/329 |
| 5,623,990 A | * | 4/1997 | Pirkle | 236/12.2 |
| 6,929,187 B2 | * | 8/2005 | Kempf et al. | 236/12.11 |
| 6,935,569 B2 | * | 8/2005 | Brown et al. | 236/34.5 |
| 7,231,764 B2 | * | 6/2007 | Mangano et al. | 60/329 |
| 7,740,182 B2 | * | 6/2010 | Lum et al. | 236/12.13 |

OTHER PUBLICATIONS

Stewart et al, Fluid Power, Bobbs-Merrill Educatonal Publishing, Indianapolis, © 1980.*

* cited by examiner

*Primary Examiner* — F. Daniel Lopez
(74) *Attorney, Agent, or Firm* — Christopher C. Dremann, P.C.; Christopher C. Dremann

(57) ABSTRACT

A protection valve for a hydraulic drive system and a method for protecting the hydraulic drive system and pumping equipment driven by the hydraulic drive system includes a valve body, an actuator shaft movably disposed within the valve body, a thermal actuator for displacing the actuator shaft between an un-actuated position and an actuated position, and a poppet attached to the actuator shaft for movement therewith. The thermal actuator is configured to displace the actuator shaft between the un-actuated position and the actuated position in response to a hydraulic oil temperature that exceeds a predetermined maximum. A thermal actuator body is rigidly attached to the valve body at one end and a valve seat body is rigidly attached to the valve body at the other end. The thermal actuator body has openings formed therein for placing hydraulic oil in fluid communication with the thermal actuator.

9 Claims, 4 Drawing Sheets

PROTECTION VALVE FOR HYDRAULIC DRIVE SYSTEM

CROSS REFERENCE TO RELATED APPLICATION

This application claims the benefit of priority of U.S. Provisional Application No. 61/169,021 filed on Apr. 14, 2009, the disclosure of which is incorporated herein in its entirety.

FIELD OF THE INVENTION

The present invention relates generally to hydraulic drive systems. More particularly, the invention is a protection valve for a hydraulic drive system and a method for protecting a hydraulic drive system and pumping equipment driven by the hydraulic drive system.

BACKGROUND OF THE INVENTION

Commercial vehicles often include pumping equipment that is driven by a power source provided by the vehicle or a power source mounted on the vehicle. A common example is a tank truck including loading and unloading equipment for transporting and delivering a solid product, such as grain, plastic pellets or powder cement, or a liquid product, such as liquid waste, chemicals or fuel oil. Tank truck loading and unloading equipment typically includes a blower, a compressor or a vacuum pump driven by a power take-off (PTO) from the truck engine, an electric motor or an auxiliary gasoline or diesel engine. Historically, the preferred method of powering tank truck pumping equipment has been a mechanical driveline coupled to the PTO from the truck engine, and the amount of space on the truck chassis occupied by the mechanical driveline has not been problematic. As a result of recently enacted environmental regulations lowering the permissible amount of diesel emissions and pollutants, the space on a tank truck chassis occupied by a compliant exhaust system severely limits the amount of space available for installation and operation of pumping equipment driven by a mechanical driveline.

The use of the PTO from the truck engine and a mechanical driveline to drive pumping equipment on a tank truck has further shortcomings in addition to space limitations. Proper operation of the pumping equipment for a particular application requires the selection of a blower, compressor or vacuum pump having a suitable speed, pressure and/or vacuum. Driving a blower, compressor or vacuum pump via a PTO and mechanical driveline, however, results in the speed of the pumping equipment being directly proportional to the speed of the truck engine. Similarly, when the pumping equipment is directly driven by an electric motor via a coupling and/or gearbox, the speed of the blower, compressor or vacuum pump is directly proportional to the speed of the electric motor. Operation of the pumping equipment under its minimum rated operating speed can result in damage to the blower, compressor or vacuum pump. Damage to the pumping equipment can also result from operating the blower, compressor or vacuum pump beyond its maximum rated operating pressure or vacuum. The pressure and vacuum relieving devices, such as mechanically or electrically actuated valves, currently available require frequent and repeated maintenance since they exhibit a tendency to seize as a result of corrosion resulting from environmental conditions and road debris.

Many of the deficiencies associated with the use of a truck engine PTO and mechanical driveline can be overcome by using a hydraulic drive system to drive pumping equipment on a tank truck. With a hydraulic drive system there is no direct connection to the motive power provided by the PTO from the truck engine. Instead, a hydraulic pump connected to the PTO pumps hydraulic fluid (e.g. oil) to a hydraulic motor, which in turn drives the blower, compressor or vacuum pump. As a result, the hydraulic pressure produced by the hydraulic pump is directly proportional to the horsepower requirements of the blower, compressor or vacuum pump. Proper sizing of the hydraulic components (i.e. hydraulic pump and hydraulic motor) will cause the hydraulic drive system to initially operate the blower, compressor or vacuum pump at the correct speed, pressure and/or vacuum. Other advantages of a hydraulic drive system include the ability to place the blower, compressor or vacuum pump at any convenient location on the tank truck. In addition, hydraulically driving a blower, compressor or vacuum pump eliminates the potentially dangerous rotating shafts that are typically exposed with a mechanical driveline coupled to a truck engine PTO, as well as the accompanying alignment concerns. Further benefits of a hydraulic drive system relative to a mechanical drive line include slower start-up and emergency shutdown capability.

As the components of the hydraulic system wear over time, however, the hydraulic pump will lose efficiency and provide less oil to the hydraulic motor for the same operating speed. In turn, the hydraulic motor will generate less power and cause the blower, compressor or vacuum pump to operate at a slower speed. As previously mentioned, operation of the pumping equipment below its minimum rated operating speed can result in damage to the blower, compressor or vacuum pump. Increasing wear also causes a rise in the oil temperature. In the event the oil temperature exceeds the cooling capacity of the hydraulic heat exchanger (commonly referred to as the hydraulic cooler), the oil will begin to breakdown and consequently cause damage to the components of the hydraulic drive system, particularly the pump and motor. Damage to the hydraulic components will further reduce the efficiency of the hydraulic pump and the power of the hydraulic motor, thereby further slowing the operating speed of the blower, compressor or vacuum pump and causing additional damage when the pumping equipment is operated below its minimum rated operating speed. If the available pressure or vacuum relief valve does not function suitably, the blower, compressor or vacuum pump may operate above (or below) the design pressure causing the hydraulic oil pressure to rise and generate additional heat. As previously mentioned, the hydraulic drive system will overheat and damage the hydraulic components if the oil temperature exceeds the cooling capacity of the hydraulic cooler.

As previously mentioned, a significant advantage of a hydraulic drive system as opposed to a mechanical driveline or electric motor is the ability to control the speed of the pumping equipment. However, many truck engines require the operator to select the correct engine speed (i.e. RPM) for the hydraulic drive system. In the event the operator incorrectly selects an excessive engine speed, the hydraulic pump likewise operates at excessive speed and consequently increases the amount of hydraulic oil flowing to the hydraulic motor, which in turn increases the operating speed of the blower, compressor or vacuum pump. The increased speed allows the blower, compressor or vacuum pump to absorb additional horsepower. The additional horsepower absorbed by the blower, compressor or vacuum pump increases the pressure of the hydraulic oil and adds additional heat to the hydraulic drive system. As previously described, if the additional heat exceeds the capacity of the hydraulic cooler, the hydraulic drive system will overheat and damage the pumping equipment.

Regardless, an operator can overheat a hydraulic drive system and potentially damage the blower, compressor or vacuum pump as a result of over-pressurization. The hydraulic oil temperature will rise in all instances in which the hydraulic drive system is operating improperly and, if the hydraulic oil temperature exceeds the capacity of the hydraulic cooler, the components of the hydraulic drive system will be damaged, potentially also damaging the pumping equipment. It is possible to provide the blower, compressor or vacuum pump with flow-compensating or temperature-compensating controls to maintain the speed of the pumping equipment relatively constant. Such controls, however, are costly, require frequent maintenance and inherently susceptible to failure. Likewise, over-pressurization and the resultant over-heating can be avoided with suitable electrical sensors and flow control equipment, such as a hydraulic oil temperature transducer and a valve actuator that operates in response to the temperature transducer to vent the blower/compressor pressure or vacuum pump vacuum. Again, however, such sensors and control equipment adds significant cost, complexity and reliability concerns.

Accordingly, there exists an unresolved need for an apparatus and method for the protection of a hydraulic drive system and pumping equipment driven by the hydraulic drive system. More particularly, there exists a need for a protection valve for a hydraulic drive system and a method for protecting a hydraulic drive system and pumping equipment driven by the hydraulic drive system. There exists a specific need for a purely mechanical protection valve including means for venting air pressure or vacuum to the ambient atmosphere in response to a hydraulic oil temperature that exceeds the capacity of the hydraulic cooler of a hydraulic drive system.

SUMMARY OF THE INVENTION

In one aspect, the present invention provides a protection valve for a hydraulic drive system. The protection valve includes a valve body, an actuator shaft movably disposed within the valve body, a thermal actuator for displacing the actuator shaft between an un-actuated (i.e. closed) position and an actuated (i.e. opened) position, and a valve poppet attached to the actuator shaft for movement therewith. The thermal actuator is configured to displace the actuator shaft relative to the valve body between the un-actuated position and the actuated position in response to a change in a hydraulic oil temperature.

In another aspect, the present invention provides a hydraulic drive system for driving pumping equipment including a hydraulic pump operatively coupled to a power source, a hydraulic motor operatively coupled to the hydraulic pump and to the pumping equipment, a high pressure line extending between the hydraulic pump and the hydraulic motor for conveying hydraulic oil from the hydraulic pump to the hydraulic motor, a hydraulic cooler operatively coupled to the hydraulic motor and to the hydraulic pump, a low pressure return line extending between the hydraulic motor and the hydraulic cooler for conveying hydraulic oil from the hydraulic motor to the hydraulic cooler, and a protection valve configured to vent pressure or vacuum from the pumping equipment in response to a change in a hydraulic oil temperature.

In yet another aspect, the present invention provides a method for protecting a hydraulic drive system and pumping equipment driven by the hydraulic drive system. The method includes providing a hydraulic drive system comprising at least a hydraulic pump, a hydraulic cooler and hydraulic oil in fluid communication with the hydraulic pump and the hydraulic cooler. The method further includes operatively coupling pumping equipment to the hydraulic drive system. The method further includes driving the pumping equipment using the hydraulic drive system to pressurize an air vent line, or alternatively, to vacuum the air vent line. The method further includes positioning a protection valve in fluid communication with the hydraulic oil of the hydraulic drive system, and actuating the protection valve in response to a temperature of the hydraulic oil exceeding a predetermined maximum hydraulic oil temperature such that the air vent line is in fluid communication with the ambient atmosphere.

BRIEF DESCRIPTION OF THE DRAWINGS

The following detailed description of the invention is best understood with reference to the accompanying drawing figures.

DETAILED DESCRIPTION OF THE INVENTION

Figure 1:
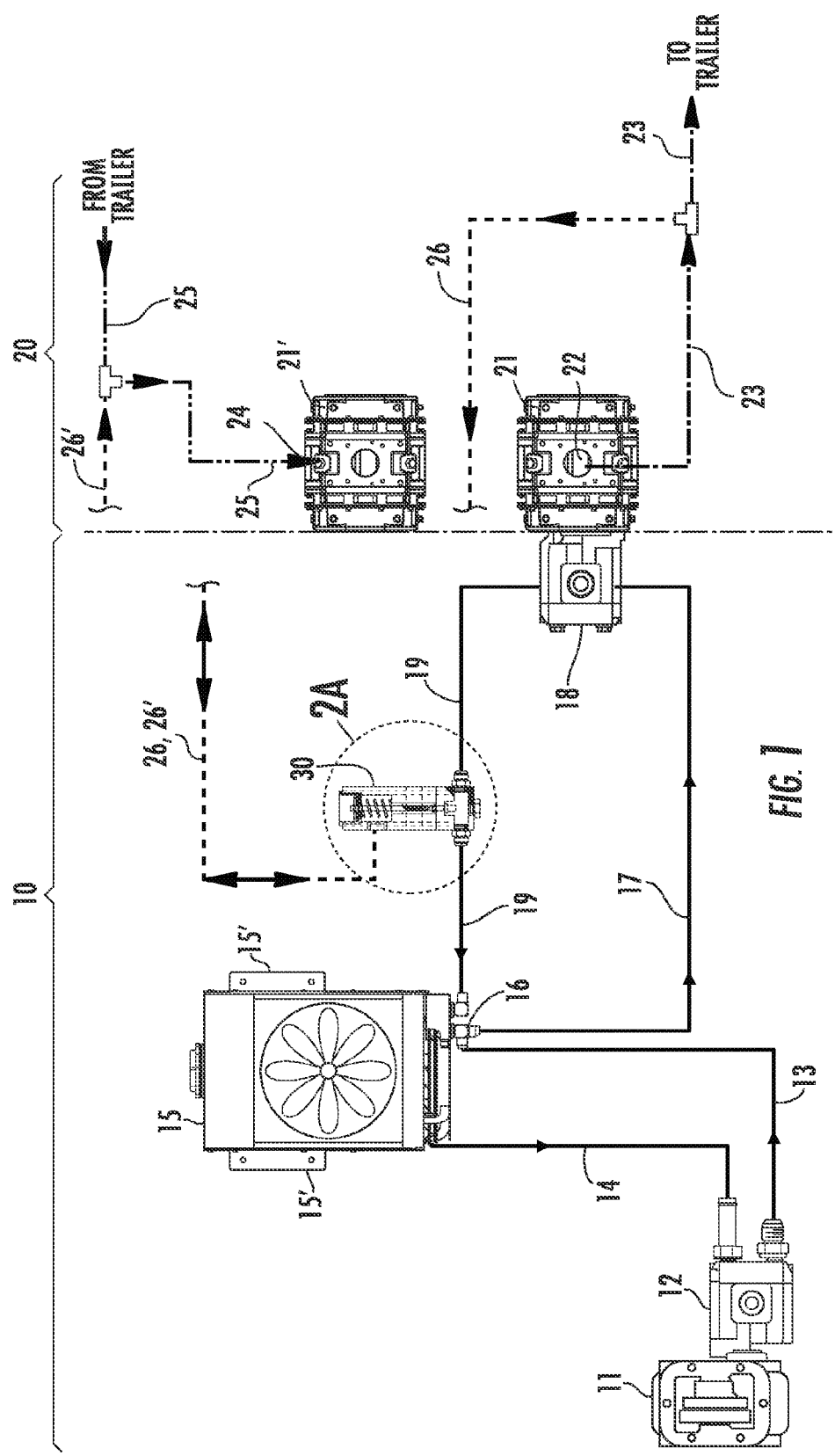
FIG. 1 is a schematic diagram illustrating a hydraulic drive system for driving pumping equipment including a protection valve according to the present invention for protecting the pumping equipment from damage.

Referring now to the accompanying drawing figures wherein like reference numerals denote like elements throughout the various views, FIG. 1 shows a hydraulic drive system, indicated generally at 10, configured for driving equipment, for example pumping equipment, indicated generally at 20. As shown and described herein, the pumping equipment 20 may comprise a blower or compressor 21, or alternatively a vacuum pump 21', mounted on a tank truck (not shown). However, the invention is not limited in any manner to blowers, compressors and vacuum pumps mounted on a tank truck. Instead, a hydraulic drive system 10 according to the invention may be used with any type of equipment capable of being hydraulically-driven, and the equipment may be mounted in any location and in any manner suitable for use with a hydraulic drive system.

The hydraulic drive system 10 is operatively coupled to a power source. As shown in FIG. 1, the power source is a power take-off (PTO) 11 from a truck engine. However, the invention is not limited in any manner by the power source, and instead, a hydraulic drive system 10 according to the invention may be powered by any other suitable power source, including by way of example and not limitation, an electric motor or an auxiliary gasoline or diesel engine. As shown and described herein, a hydraulic pump 12 of the hydraulic drive system 10 is operatively coupled by a direct drive coupling to the PTO 11 from the truck engine. The close-coupled hydraulic pump 12 pumps hydraulic oil through a high pressure output line 13 from the hydraulic pump to the hydraulic motor 18, A relief valve (not shown) located inside a hydraulic cooler 15 is connected to line 13 and 17 via a tee connection 16. The relief valve relieves excess pressure from the hydraulic drive system 10 and supplies hydraulic oil to the hydraulic cooler 15 as needed. The hydraulic cooler 15 typically includes one or more mounting flanges 15' for securing the hydraulic cooler to the frame or other supporting structure on the tractor of the truck. A low pressure suction line 14 connects the between the hydraulic cooler 15 and the hydraulic pump 12 to return the cooled hydraulic oil to the hydraulic pump. A hydraulic drive system including a hydraulic cooler suitable for use with the invention is the HydraFLOW™ hydraulic drive system commercially available from Paragon Tank Truck Equipment, LLC of Cartersville, Ga., USA.

A high pressure line 17 in fluid communication with the high pressure output line 13 from the hydraulic pump 12 is connected to tee connection 16 at one end and to a hydraulic motor 18 at the other end. The hydraulic motor 18 is operatively coupled to the pumping equipment 20 in a well known manner. A low pressure return line 19 is connected at one end to the hydraulic motor 18 and at the other end to the hydraulic cooler 15 through a conventional fluid coupling (not numbered). It should be noted that the high pressure output line 13 and the low pressure suction line 14 connected between the hydraulic pump 12 and the hydraulic cooler 15, as well as the high pressure line 17 and the low pressure return line 19 connected between the hydraulic cooler 15 and the hydraulic motor 18, may be any conduit suitable for conveying hydraulic oil at elevated pressure and temperature. Preferably, at least the high pressure output line 13 and the high pressure line 17 are flexible conduits suitable for conveying hydraulic oil at pressures and temperatures well above ambient conditions. Suitable flexible conduits include Weatherhead® hydraulic hoses commercially available from Applied Industrial Technologies, of Cleveland, Ohio, USA.

Accordingly, the hydraulic drive system 10 is configured to drive the pumping equipment 20 in a conventional manner. In particular, the PTO 11 from the truck engine powers the hydraulic pump 12 to pump hydraulic oil through the high pressure output line 13 and the high pressure line 17 to power the hydraulic motor 18. The hydraulic motor 18 powers the pumping equipment 20 and the spent hydraulic oil (i.e. hydraulic oil used by the hydraulic motor 18) is carried by the low pressure return line 19 to the hydraulic cooler 15, where excess heat is extracted from the hydraulic oil. The cooled hydraulic oil is then returned to the hydraulic pump 12 from the hydraulic cooler 15 through the low pressure suction line 14. Thus, the hydraulic drive system 10 forms a continuous loop power transmission circuit for driving the pumping equipment 20.

The hydraulic drive system 10 shown and described herein is a typical circuit. Countless variations of the type, number and placement of the components, including for example without limitation the location of the relief coupling for the hydraulic cooler 15, are known and equally suitable for use with the invention. The invention is broadly directed to the use and packaging of a protection valve 30, as will be described hereinafter, to alleviate (i.e. vent) pressure or vacuum from equipment driven by a hydraulic drive system in response to the hydraulic oil temperature exceeding the capacity of the hydraulic cooler. Accordingly, one of ordinary skill in the art will readily recognize that the invention can be used with various hydraulic drive systems powered by various power sources in any number of different applications.

As shown and described herein, the pumping equipment 20 comprises a blower/compressor 21, or a vacuum pump 21'. As previously mentioned, however, a hydraulic drive system 10 and protection valve 30 according to the invention may be used to vent the liquid around a liquid pump that is driven by a hydraulic drive system that may be damaged when the hydraulic drive system is not functioning to specifications and the hydraulic oil temperature rises in response to improper operation, such as over-pressurization. In the event the pumping equipment 20 comprises a blower, compressor or the like, an air discharge line 23 is attached to the blower/compressor 21 at an output port 22 in a known manner. Air flows out of the blower/compressor 21 through the discharge line 23 in the indicated direction to, for example, a tank trailer containing a solid or liquid product to be unloaded from the trailer. In accordance with the invention, an air vent line 26 is introduced between the blower/compressor 21 and the protection valve 30 such that the air vent line 26 is pressurized when the blower/compressor is operating. Conversely, in the event the pumping equipment 20 comprises a vacuum pump or the like, an air intake line 25 is attached to the vacuum pump 21' at an intake port 24 in a known manner. Air flows into the vacuum pump 21' through the intake line 25 in the indicated direction from, for example, a tank trailer containing a solid or liquid product to be loaded into the trailer. In accordance with the invention, an air vent line 26' is introduced between the vacuum pump 21' and the protection valve 30 such that the air vent line 26' is under vacuum relative to the ambient atmosphere (i.e. the pressure in air vent line 26' is below atmospheric pressure) when the vacuum pump is operating.

In theory, a balanced hydraulic drive system 10 in a frictionless environment and absent external influences would operate indefinitely in the manner described above. As previously described, however, components of the hydraulic drive system 10 will inevitably wear over time and the pumping equipment 20 will operate at a slower speed. It is also likely that the operator will over-pressurize the hydraulic drive system 10 and the pumping equipment 20 at some time. Under either condition, the hydraulic oil pressure and ultimately the hydraulic oil temperature will increase beyond the capacity of the hydraulic cooler 15 to extract sufficient heat from the hydraulic oil. Whenever the hydraulic oil temperature exceeds a predetermined maximum, a hydraulic protection valve 30 according to the invention operatively coupled to the hydraulic drive system 10 will open and vent pressure from the pumping equipment 20 (e.g. blower/compressor 21), or alternatively, vent vacuum from the pumping equipment 20 (e.g. vacuum pump 21') to the ambient atmosphere, which in turn reduces the horsepower demand from the pumping equipment, and consequently lowers the hydraulic oil temperature. Once the adverse condition is corrected and the hydraulic oil temperature is reduced at or below the predetermined maximum, the protection valve 30 closes again and the hydraulic drive system 10 operates in the manner described above to drive the pumping equipment 20. It should be noted that the protection valve 30 will only partly close as the hydraulic oil cools, and will not completely close unless and until the additional loading on the pumping equipment 20 has been removed from the hydraulic drive system 10.

Figure 2A:
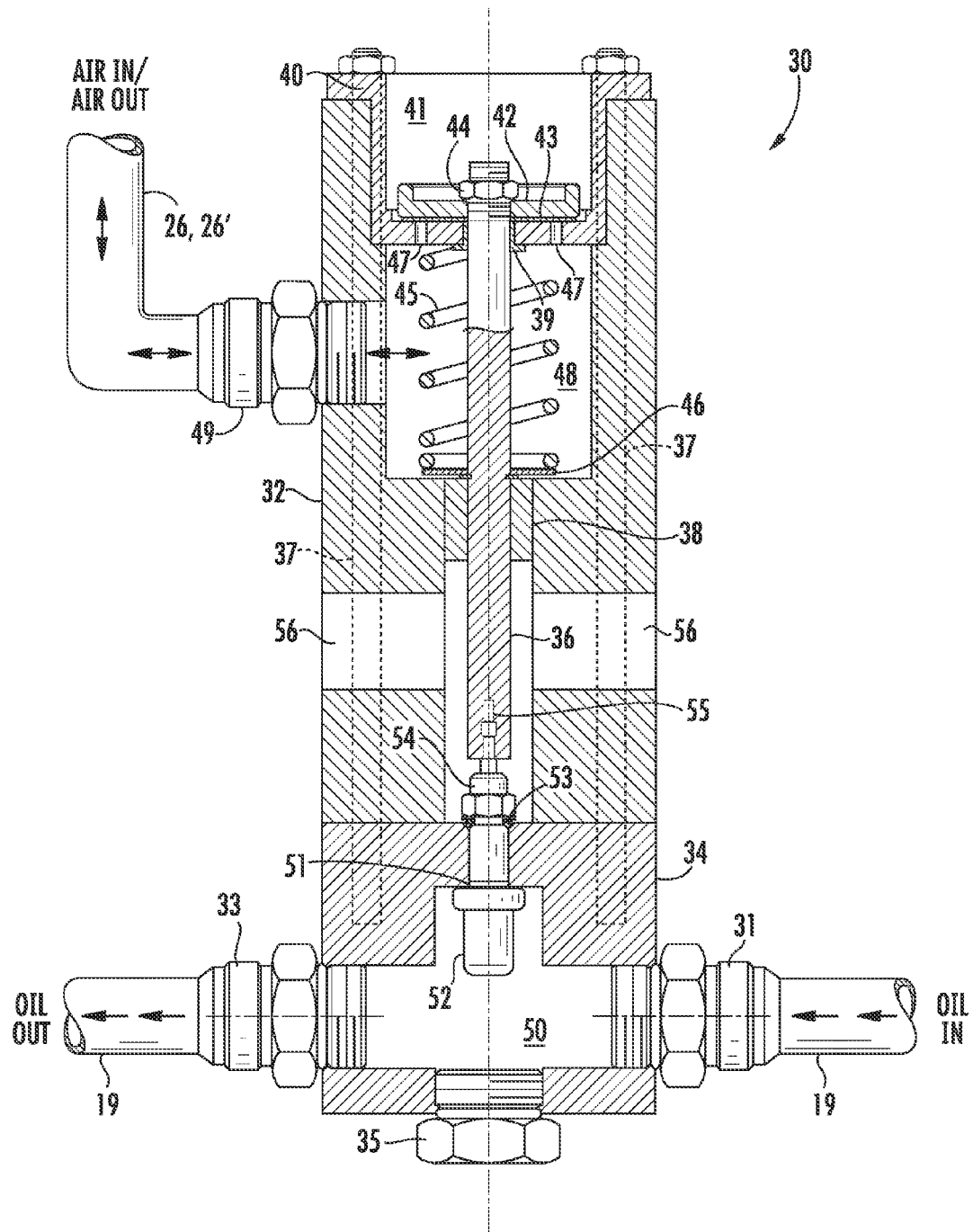
FIG. 2A is an enlarged partial section view of the protection valve of FIG. 1 shown in the closed position.
Figure 2B:
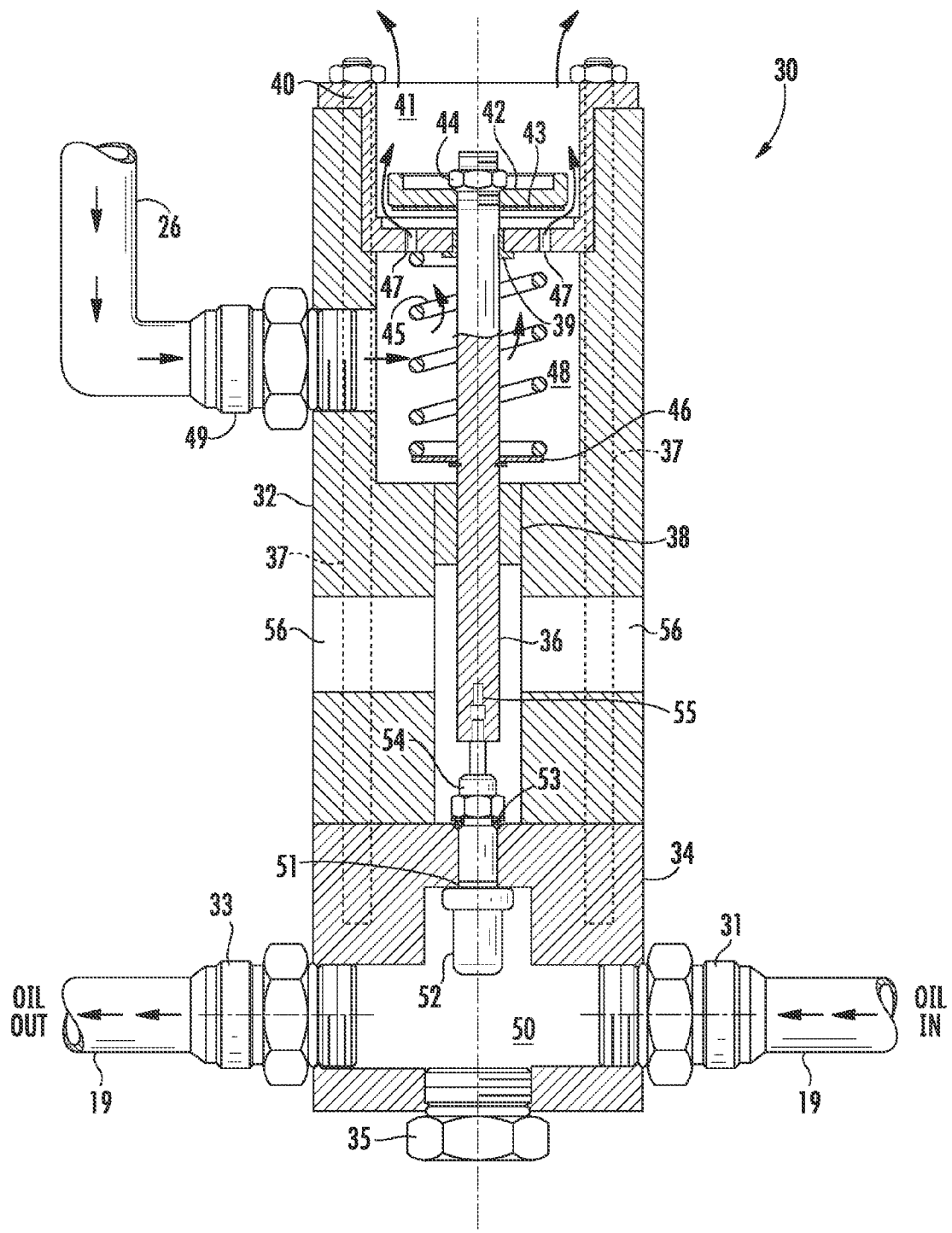
FIG. 2B is an enlarged partial section view of the protection valve of FIG. 1 shown in the opened position.

Protection valve 30 is preferably bi-directional and may be positioned at any location within the hydraulic drive system 10. As shown in FIG. 1, the protection valve 30 is preferably positioned along the low pressure return line 19 medially between the hydraulic motor 18 and the hydraulic cooler 15. The low pressure return line 19 is readily accessible and normally has a larger diameter which provides a greater amount of dwell time for the hydraulic oil within the protection valve 30. FIG. 2A shows the protection valve 30 in an un-actuated, or closed, position when the hydraulic drive system 10 is functioning properly and within operating specifications. FIG. 2B shows the protection valve 30 in an actuated, or opened, position when the hydraulic drive system 10 is not functioning within operating specifications, and more particularly, when the hydraulic oil temperature exceeds the predetermined maximum.

As shown, the protection valve 30 comprises a generally cylindrical, generally hollow valve body 32 and a generally cylindrical, generally hollow thermal actuator body 34 rigidly attached to one end of the valve body in tight-sealing engagement. The thermal actuator body 34 has a pair of internally-threaded openings formed therein with each opening configured to receive a standard externally-threaded National Pipe Taper (NPT) or other common hydraulic thread type fitting 31, 33 attached to a free end of the low pressure return line 19. The NPT fittings 31, 33 are preferably diametrically opposed from one another on the thermal actuator body, but may be positioned at any desired location relative to one another. Regardless, the thermal actuator body 34 defines a thermal actuator chamber 50 in fluid communication with the NPT fittings 31, 33, for a purpose to be described. A third threaded opening formed in the thermal actuator body 34 receives a removable access plug 35 for accessing the thermal actuator chamber 50, and in particular, a thermal actuator 52 disposed within the thermal actuator chamber. The NPT fitting 31 defines an "OIL IN" connection with the low pressure return line 19, while the NPT fitting 33 defines an "OIL OUT" connection with the low pressure return line.

An actuator shaft 36 is centrally disposed within the hollow valve body 32 above the thermal actuator body 34. In addition, a pair of elongate, open cooling slots 56 are formed through the valve body 32. The cooling slots 56 are radially outwardly disposed from the central disposed actuator shaft 36. A guide bearing 38 slidingly guides the actuator shaft 36 upwardly into a spring chamber 48, while a slide bushing 39 slidingly guides the actuator shaft 36 upwardly into a vent chamber 41. A generally cylindrical, generally hollow valve seat body 40 is rigidly attached to the valve body 32 at the end opposite the thermal actuator body 34. As shown, the valve body 32, thermal actuator body 34 and the valve seat body 40 are secured together by lengthwise threaded rods 37. However, they may be secured together temporarily or permanently in any suitable manner, for example by welding or by an adhesive.

Regardless, the valve seat body 40 defines the vent chamber 41 that is open to the ambient atmosphere. A valve poppet 42 and a valve seat 43 are supported on an externally-threaded end of the actuator shaft 36 and retained thereon in sealing engagement with the valve seat body 40 by an internally-threaded retaining nut 44. A spring 45 is disposed about the actuator shaft 36 within the spring chamber 48 and secured to the actuator shaft at the lower end of the spring by a spring retainer 46. Accordingly, the spring 45 biases the actuator shaft 36 in the un-actuated, or closed, position shown in FIG. 2A. Upward movement of the actuator shaft 36 relative to the valve body 32 and the valve seat body 40, however, will overcome the biasing force and cause compression of the spring 45 along with accompanying upward movement of the valve poppet 42 and valve seat 43 retained on the actuator shaft by the retaining nut 44. A series of holes 47 formed through the valve seat body 40 places the spring chamber 48 in fluid communication with the vent chamber 41 and thereby permits air to transfer therebetween while the poppet valve 42 and the valve seat 43 are in the actuated, or opened, position shown in FIG. 2B.

The thermal actuator 52 disposed within the thermal actuator chamber 50 is configured to expand in the presence of hydraulic oil having a hydraulic oil temperature that exceeds the predetermined maximum. In a preferred embodiment, the thermal actuator 52 is a wax-filled solid-liquid phase device having a set point that actuates the protection valve 30 in response to a physical property of the hydraulic oil, and more particularly, in response to the hydraulic oil temperature exceeding the predetermined maximum hydraulic oil temperature. The wax in the thermal actuator 52 is specially formulated to melt at a predetermined temperature. In the embodiments shown and described herein, the wax is formulated to melt when the temperature of the hydraulic oil within thermal actuator chamber 50 exceeds the temperature at which the hydraulic oil begins to break down (i.e. degrade in performance). In particular examples, the wax is formulated to melt at between about 180° F. and about 220° F. A thermal actuator 52 suitable for use with the invention is a Temperature Sensing Control Valve commercially available from Caltherm Corporation of Columbus, Ind., USA.

Regardless, when the temperature of the hydraulic oil reaches the predetermined maximum, the wax in the thermal actuator 52 melts and rapidly expands. The thermal actuator 52 is sealed against the thermal actuator body on one side by a primary O-ring seal 51 and on the other side of the thermal actuator body by a secondary O-ring seal 53 secured by a retaining nut 54. Accordingly, expansion of the wax exerts an upward force on an actuator pin 55 in contact with the actuator shaft 36, which in turn imparts an upward force on the actuator shaft. As previously mentioned, upward movement of the actuator shaft 36 causes compression of the spring 45 biasing the protection valve 30 in the un-actuated, or closed, position. At the same time, the actuator shaft 36 lifts the valve poppet 42 and the valve seat 43 off the valve seat body 40, thereby allowing air to transfer between the spring chamber 48 and the vent chamber 41 in the actuated, or opened, position.

The valve body 32 has an opening formed therein for receiving the air vent line 26, 26' in fluid communication with the spring chamber 48. As shown, an externally threaded NPT fitting or other common hydraulic thread type fitting 49 is attached to the free end of the air vent line 26, 26', as previously described with respect to NPT fittings 31, 33. Similarly, NPT fitting 49 defines an "AIR IN/AIR OUT" connection with the air vent line 26, 26'. When the air vent line from the pumping equipment 20 is pressurized with air from a blower/compressor 21, air will flow from the air vent line 26 into the spring chamber 48, through the holes 47 in the valve seat body 40 and into the vent chamber 41 to vent pressure to the ambient atmosphere. This situation is illustrated in FIG. 2B by the arrows indicating the direction of the air flow from the air vent line 26 to ambient atmosphere. Conversely, when the air vent line from the pumping equipment 20 is under vacuum from a vacuum pump 21', air will flow from the ambient atmosphere into the vent chamber 41 through the holes 47 in the valve seat body 40 into the spring chamber 48 and out the air vent line 26' to vent vacuum from the ambient atmosphere. In this latter case, the arrows indicating the direction of the air flow in FIG. 2B are reversed. Once the hydraulic oil temperature returns below the predetermined maximum, the wax in the thermal actuator 52 will re-solidify and contract, thereby releasing the upward force exerted on the actuator shaft 36 and allowing the biasing force of the spring 45 to return the actuator to the un-actuated, or closed, position.

Figure 3:
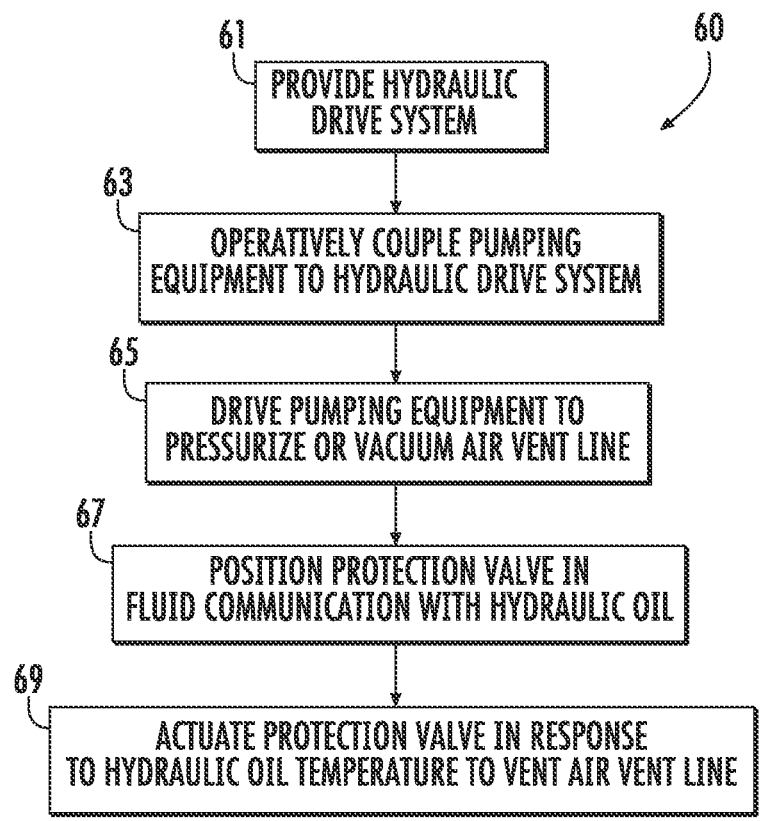
FIG. 3 is a flowchart illustrating a method according to the present invention for protecting a hydraulic drive system and pumping equipment driven by the hydraulic drive system.

A method according to the present invention for protecting a hydraulic drive system and pumping equipment driven by the hydraulic drive system is illustrated in FIG. 3. The method, indicated generally at 60, comprises in step 61 providing a hydraulic drive system 10 comprising at least a hydraulic pump 12, a hydraulic cooler 15 and hydraulic oil in fluid communication with the hydraulic pump and the hydraulic cooler. Preferably, the hydraulic oil is conveyed by the hydraulic oil lines 13, 17, 19, 14 in the manner previously described. The method 60 further comprises in step 63 operatively coupling pumping equipment 20 to the hydraulic drive system 10 in the manner previously described. As indicated by step 65, the hydraulic drive system 10 is used to drive the pumping equipment 20 to pressurize an air vent line 26, or alternatively, to place the air vent line 26' under vacuum relative to the ambient atmosphere. As indicated by step 67, the method 60 further comprises positioning a protection valve 30 in fluid communication with the hydraulic oil of the hydraulic drive system 10. The method 60 further comprises in step 69 actuating the protection valve 30 in response to a temperature of the hydraulic oil exceeding a predetermined maximum hydraulic oil temperature such that the air vent line 26, 26' is in fluid communication with the ambient atmosphere.

As previously described, the protection valve 30 may comprise a valve body 32, an actuator shaft 36 movably disposed within the valve body, a thermal actuator 52 for displacing the actuator shaft between an un-actuated position and an actuated position, and a valve poppet 42 attached to the actuator shaft for movement therewith. The thermal actuator 52 may be configured to displace the actuator shaft 36 relative to the valve body 32 between the un-actuated position and the actuated position in response to a change in a hydraulic oil temperature, and more particularly, in response to the temperature of the hydraulic oil exceeding a predetermined maximum hydraulic oil temperature. As previously described, the thermal actuator 52 preferably comprises a wax-filled solid-liquid phase device having a set point that displaces the actuator shaft 36 in response to the hydraulic oil temperature exceeding the predetermined maximum. The protection valve 30 further comprises a thermal actuator body 34 for housing the thermal actuator 52 that has a pair of openings formed therein for conveying the hydraulic oil in fluid communication with the thermal actuator. Similarly, the valve body 32 has an opening formed therein for receiving the air vent line in fluid communication with the ambient atmosphere to vent pressure or vacuum from the pumping equipment when the actuator shaft 36 is displaced in the actuated position.

The foregoing has described one or more exemplary embodiments of a protection valve for a hydraulic drive system of the type commonly used to drive pumping equipment, such as a blower, compressor or vacuum pump mounted on a tank truck or tank trailer. In the exemplary embodiments shown and described herein, the protection valve includes a valve body and an actuator shaft movably disposed within the valve body. The protection valve further includes a thermal actuator for displacing the actuator shaft between an un-actuated position and an actuated position in response to the hydraulic oil temperature exceeding a predetermined maximum. While exemplary embodiments have been shown and described for the purpose of providing a complete and accurate description of the invention sufficient to enable one of ordinary skill in the art to make, use and practice the invention, it will be readily apparent that the invention may take many forms and may be used in many applications, including for example and without limitation, in a conventional hydraulic drive system for driving any type of equipment capable of being hydraulically-driven, without departing from the spirit and scope of the invention, which is intended to be limited only by the appended claims.

That which is claimed is:

1. A protection valve for a hydraulic drive system, the protection valve comprising:
    a valve body having a first end and an opposite second end;
    an actuator shaft movably disposed within the valve body;
    a thermal actuator body attached to the valve body at the first end, the thermal actuator body having an inlet for receiving a hydraulic fluid from a hydraulic drive system and an outlet for returning the hydraulic fluid to the hydraulic drive system;
    a thermal actuator disposed within the thermal actuator body in fluid communication with the hydraulic fluid for moving the actuator shaft from an un-actuated position wherein the valve body is closed to the ambient atmosphere to an actuated position wherein the valve body is open to the ambient atmosphere;
    a valve seat body attached to the valve body at the second end opposite the first end;
    a spring disposed between the valve body and the valve seat body, the spring being retained on the actuator shaft between the valve seat body and the valve body and biasing the actuator shaft towards the un-actuated position;
    a valve poppet movably disposed within the valve seat body and attached to the actuator shaft for movement therewith against the bias of the spring;
    wherein the thermal actuator is configured to move the actuator shaft and the valve poppet relative to the valve body, the thermal actuator body and the valve seat body from the un-actuated position to the actuated position in response to a temperature of the hydraulic fluid exceeding a predetermined maximum temperature.

2. A protection valve according to claim 1, wherein the thermal actuator comprises a wax-filled solid-liquid phase device that moves the actuator shaft in response to the temperature of the hydraulic fluid exceeding the predetermined maximum temperature.

3. A protection valve according to claim 1, wherein the valve body has an opening formed therein for receiving an air vent line that is open to the ambient atmosphere when the actuator shaft is in the actuated position and the valve poppet is moved with the actuator shaft relative to the valve body, the thermal actuator body and the valve seat body.

4. A protection valve according to claim 1, wherein the thermal actuator body is rigidly attached to the valve body at the first end and the valve seat body is rigidly attached to the valve body at the second end.

5. A protection valve according to claim 1, wherein the inlet and the outlet of the thermal actuator body are each configured to receive a National Pipe Taper (NPT) fitting.

6. A protection valve according to claim 1, wherein the valve seat body has at least one hole formed therethrough and the valve poppet is configured to seat onto the valve seat body over the at least one hole when the actuator shaft is in the un-actuated position.

7. A protection valve according to claim 1, wherein the valve body defines a first chamber and wherein the valve seat body defines a second chamber that is in fluid communication with the first chamber when the actuator shaft is in the actuated position.

8. A protection valve according to claim 7, wherein the first chamber and the second chamber are both open to the ambient atmosphere when the actuator shaft is in the actuated position.

9. A protection valve according to claim 8, wherein the valve body has an opening formed therein for receiving an air vent line that is open to the ambient atmosphere when the actuator shaft is in the actuated position and the valve poppet is moved with the actuator shaft.

* * * * *